(12) United States Patent
Daniel et al.

(10) Patent No.: US 10,792,983 B2
(45) Date of Patent: Oct. 6, 2020

(54) VEHICLE HUMIDIFIER SYSTEM

(71) Applicant: FORD GLOBAL TECHNOLOGIES, LLC, Dearborn, MI (US)

(72) Inventors: John K. Daniel, Saline, MI (US); Douglas Raymond Martin, Canton, MI (US); Kenneth James Miller, Canton, MI (US); Kenneth J. Jackson, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 23 days.

(21) Appl. No.: 15/711,596

(22) Filed: Sep. 21, 2017

(65) Prior Publication Data
US 2019/0084381 A1 Mar. 21, 2019

(51) Int. Cl.
*B60H 3/02* (2006.01)
*B60H 1/32* (2006.01)
*B60H 1/00* (2006.01)

(52) U.S. Cl.
CPC ........... *B60H 3/02* (2013.01); *B60H 1/00785* (2013.01); *B60H 1/00842* (2013.01); *B60H 1/32331* (2019.05); *B60H 3/022* (2013.01); *B60H 1/00964* (2013.01); *B60H 1/3233* (2013.01)

(58) Field of Classification Search
CPC .. B60H 3/02; B60H 1/00785; B60H 1/00842; B60H 1/00964; B60H 1/3233; B60H 3/022; B60H 1/32233
See application file for complete search history.

(56) References Cited

U.S. PATENT DOCUMENTS

| 5,524,848 A * | 6/1996 | Ellsworth | B64D 13/00 244/118.5 |
| 6,276,005 B1 * | 8/2001 | Sanders | E03D 5/003 4/665 |
| 6,375,849 B1 * | 4/2002 | Crabtree | B64D 13/08 210/195.2 |

(Continued)

FOREIGN PATENT DOCUMENTS

| CN | 101587021 A | 11/2009 |
| CN | 202066159 U | 12/2011 |

(Continued)

OTHER PUBLICATIONS

English Machine Translation of CN101587021A.
(Continued)

*Primary Examiner* — Henry T Crenshaw
(74) *Attorney, Agent, or Firm* — David Coppiellie; King & Schickli, PLLC

(57) ABSTRACT

A humidifier system for a vehicle passenger cabin includes an onboard humidifier, an onboard reservoir in fluid communication with the humidifier and adapted to collect a fluid from a vehicle heat exchanger, and a controller configured to determine at least a passenger cabin relative humidity value and a dew point value for at least one vehicle window. The controller is configured to actuate the onboard humidifier to provide a humidified airflow into the passenger cabin, and to actuate a window heating system to heat the at least one vehicle window sufficiently to prevent or remove fogging resulting from the humidified airflow. Methods for controlling the humidifier system are described.

16 Claims, 3 Drawing Sheets

(56) References Cited

U.S. PATENT DOCUMENTS

| | | | |
|---|---|---|---|
| 6,539,730 B1* | 4/2003 | Hesse | B60H 1/00778 62/91 |
| 2006/0004494 A1* | 1/2006 | Errington | B60H 1/00785 701/1 |
| 2009/0079098 A1* | 3/2009 | Ezra | B60H 1/3233 261/128 |
| 2009/0206068 A1* | 8/2009 | Ishizeki | B32B 17/10174 219/203 |
| 2009/0255323 A1* | 10/2009 | Butt | H01M 8/04007 73/29.02 |
| 2012/0009859 A1* | 1/2012 | Wijaya | B60H 1/00764 454/75 |
| 2013/0094972 A1* | 4/2013 | Smith | F01P 7/164 417/32 |
| 2014/0287334 A1* | 9/2014 | Noh | H01M 8/2465 429/429 |
| 2015/0224848 A1* | 8/2015 | Eisenhour | B60H 1/0075 62/186 |
| 2016/0083936 A1 | 3/2016 | Martin et al. | |
| 2016/0131372 A1* | 5/2016 | Choi | B01D 53/261 62/189 |
| 2017/0036517 A1* | 2/2017 | Ito | B60H 3/02 |
| 2017/0106721 A1* | 4/2017 | Hoke | B60H 1/00785 |
| 2017/0203323 A1* | 7/2017 | Gschwind | A47F 3/001 |
| 2018/0117988 A1* | 5/2018 | Sarnia | B60H 1/00785 |

FOREIGN PATENT DOCUMENTS

| | | |
|---|---|---|
| CN | 202163279 U | 3/2012 |
| CN | 104470735 A | 3/2015 |
| JP | 2008137599 A | 6/2008 |
| JP | 2008149857 A | 7/2008 |
| KR | 20160001555 U | 5/2016 |
| WO | 2016047051 A1 | 3/2016 |

OTHER PUBLICATIONS

English Machine Translation of CN104470735A.
English Machine Translation of CN202066159U.
English Machine Translation of CN202163279U.
English Machine Translation of JP2008137599A.
English Machine Translation of JP2008149857A.
English Machine Translation of KR20160001555U.
English Machine Translation of WO2016047051A1.

* cited by examiner

VEHICLE HUMIDIFIER SYSTEM

TECHNICAL FIELD

The present disclosure generally relates to onboard humidifier systems for vehicles. More specifically, the present disclosure relates to an onboard vehicle humidifier system which helps to maintain a desired passenger cabin humidity level and concurrently prevents vehicle window fogging/frosting when the passenger cabin humidity level is increased.

BACKGROUND

During certain climatic conditions, vehicle passenger cabin humidity may decrease below percentages providing an acceptable comfort level to vehicle passengers. As a non-limiting example, a room in a home kept at 70° F. is considered comfortable to an occupant at a relative humidity of 40-50%. Below that relative humidity, skin may dry and become itchy and mucosal membranes and eyes may feel dry and irritated. Similar phenomena may occur during exposure to a passenger cabin held at a below-optimal relative humidity for extended periods of time, for example during a long road trip.

This is known to occur in dry, cold seasons such as winter and in arid regions. For example, in cooler temperatures a vehicle passenger cabin humidity level may decrease to uncomfortable levels because vehicle-exterior air contains less moisture than the passenger cabin interior air. In turn, in a vehicle windows (front and rear windshield, side windows, etc.) are exposed to the ambient temperatures and are therefore colder than the passenger cabin interior. This creates a low dew point for the window that creates fog/frost. To counter this phenomenon, conventionally window defroster/defogger systems are provided which prevent or remove fog/frost from windows by directing a heated airflow against the window interior surface. While effective in countering window fog/frost, the airflow blown against the window interior surface is typically dry, resulting in the unintended consequence of further drying the passenger cabin air and further lowering the passenger cabin interior relative humidity.

This could be solved by simply incorporating a stand-alone or built-in humidifier into the vehicle's climate control accessories. However, this would require the user to perform additional tasks, such as ensuring that the stand-alone humidifier water supply was kept adequately supplied. In turn, the user would need to monitor vehicle window fog/frost status to prevent fogging/frosting during humidifier use.

Accordingly, there is identified a need in the art for methods and systems for supplementing traditional vehicle climate control systems, in particular for increasing passenger cabin relative humidity when and if needed. The methods and systems should require minimal user input, and further should contemplate issues of window fogging/frosting prevention during humidifier use.

SUMMARY

In accordance with the purposes and benefits described herein, in one aspect of the present disclosure a humidifier system for a vehicle passenger cabin is provided, comprising an onboard humidifier, an onboard reservoir in fluid communication with the humidifier and adapted to collect a fluid from a vehicle heat exchanger, and a controller configured to determine at least a passenger cabin relative humidity value and a dew point value for at least one vehicle window. The controller may be further configured to actuate the onboard humidifier to provide a humidified airflow into the passenger cabin for a sufficient time to adjust a passenger cabin relative humidity from the determined passenger cabin relative humidity value to a predetermined passenger cabin relative humidity threshold value.

The controller may be further configured to concurrently or sequentially actuate a window heating system to heat the at least one vehicle window sufficiently to prevent or remove fogging resulting from the humidified airflow. In embodiments, the controller controls an amount of heat applied to the at least one vehicle window by the window heating system according to the adjusted passenger cabin relative humidity and the determined dew point for the at least one vehicle window. Still more, the controller may be further configured to determine an amount of fluid collected in the onboard reservoir.

In embodiments, the humidified airflow may be directed into the passenger cabin through an inlet selected from one or more of a dash panel-mounted air register, a headliner-mounted air vent, a steering wheel-mounted air vent, and a hose and mask apparatus adapted to be worn by a vehicle passenger. In embodiments, the humidifier system may be adapted for manual actuation and/or for automatic actuation by the controller in accordance with the determined passenger cabin relative humidity value.

In another aspect of the disclosure, a method for providing humidified air to a passenger cabin of a vehicle is described, comprising providing an onboard humidifier system as summarized above, determining whether a humidity level of the passenger cabin is less than a predetermined threshold humidity level, and by the described controller, actuating the humidifier to provide a humidified airflow into the passenger cabin and actuating the window heating system to heat the at least one vehicle window sufficiently to prevent or remove frost and/or fog. In embodiments, the method includes actuating the humidifier until the humidity level of the passenger cabin is raised to the predetermined threshold humidity level. The method may further include, by the controller, determining an amount of fluid collected by the reservoir.

In embodiments, the method includes configuring the controller to receive inputs from one or more passenger cabin humidity sensors and from one or more window interior temperature sensors. The method may further include configuring the controller to determine the dew point for the at least one vehicle window from the inputs from the one or more passenger cabin humidity sensors and the one or more window interior temperature sensors. In embodiments, the method includes setting the predetermined threshold humidity level at a relative humidity of 60%. In embodiments, the method includes, by the controller, adjusting an amount of heat supplied by the window heating system according to the adjusted passenger cabin humidity level and the determined dew point for the at least one vehicle window.

In certain embodiments, the method includes manually actuating the humidifier system. In alternative embodiments, the method includes, by the controller, automatically actuating the humidifier system when the amount of fluid collected in the reservoir is determined by the controller to be at or above a predetermined minimum volume and the inputs provided to the controller by the one or more passenger cabin humidity sensors indicate that the passenger cabin humidity level is below the predetermined threshold humidity level. The method may further include, by the controller, automatically actuating the window heating system when the determined window dew point is above a predetermined dew point threshold.

In the following description, there are shown and described embodiments of the disclosed humidifier system for a vehicle, and methods for use thereof. As it should be realized, the described systems and methods are capable of other, different embodiments and their several details are capable of modification in various, obvious aspects all without departing from the systems and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed humidifier system for a vehicle and related methods, and together with the description serve to explain certain principles thereof. In the drawings.

Reference will now be made in detail to embodiments of the disclosed vehicle onboard humidifier system, examples of which are illustrated in the accompanying drawing figures.

DETAILED DESCRIPTION

The present disclosure is directed to an onboard humidifier system for a vehicle that can be used to increase a relative humidity of the vehicle passenger cabin while accounting for the tendency of the vehicle windows to frost or fog at higher passenger cabin relative humidity. At a high level, the described onboard humidifier system reclaims water condensation generated by other vehicle systems such as the heating, ventilation, and air-conditioning (HVAC) system, stores the reclaimed water in a reservoir, and pumps the reclaimed water to a humidifier. At need, HVAC air is directed over the humidifier to increase the relative humidity thereof, and then the humidified airflow is directed into the vehicle passenger cabin to improve passenger comfort. Concurrently or sequentially, a window heating system controls a dew point of the vehicle windows to prevent fogging/frosting.

Figure 1:
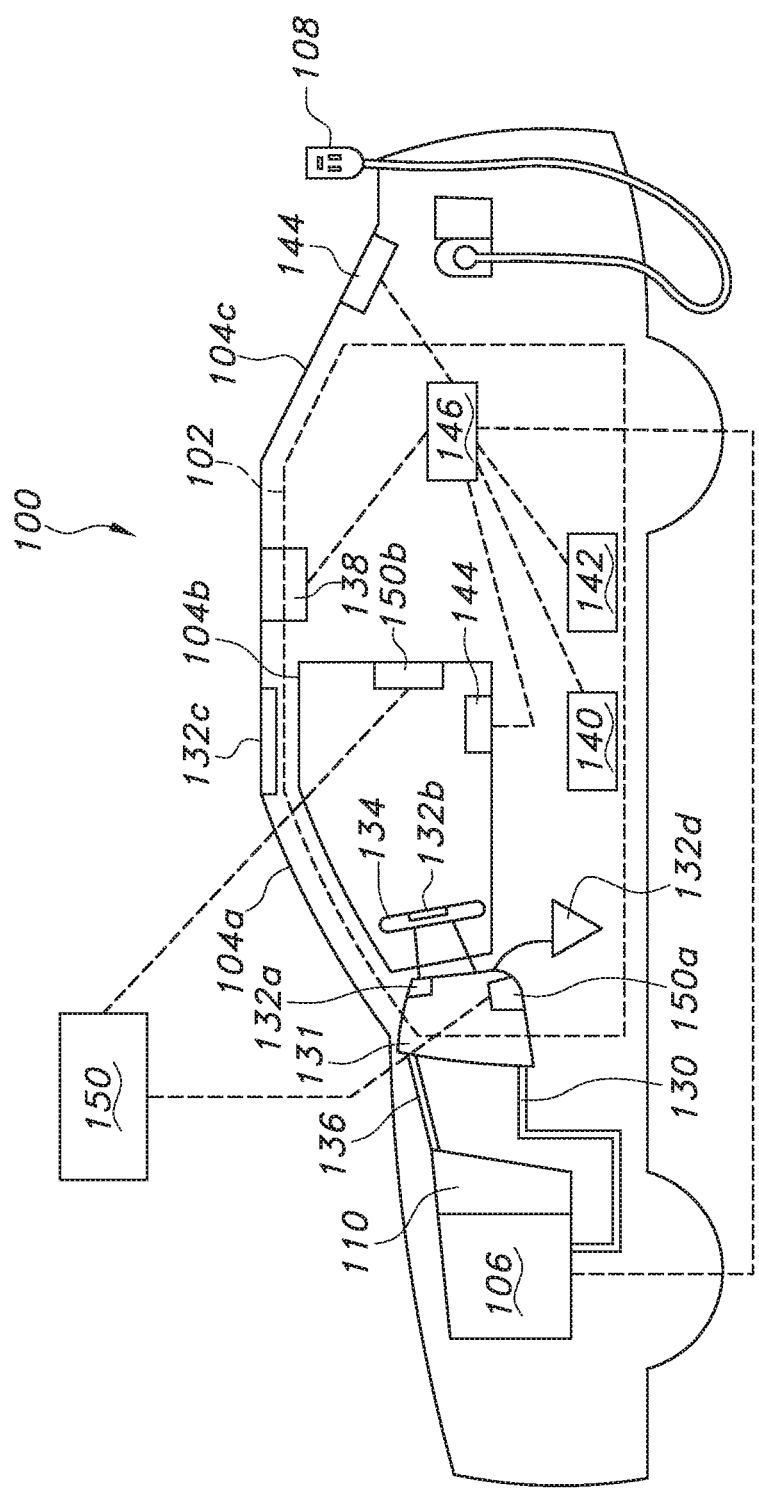
FIG. 1 depicts a vehicle including an onboard humidifier system according to the present disclosure.

With reference to FIG. 1, a vehicle 100 includes a passenger cabin 102 and a plurality of windows 104a, 104b, 104c, . . . , 104x (in the depicted embodiment, the windshield 104a, driver's side windows 104b, and rear windshield 104c are shown). The vehicle 100 further includes an onboard humidifier system 106, which as summarized above is adapted to reclaim water condensation generated by systems such as the HVAC system, and use that reclaimed water condensation to generate humidified air which can be provided to the passenger cabin 102 interior. The vehicle may be an electric vehicle as shown, including a power plug 108 adapted for connection to a power source (not shown) to charge a battery (not shown) that provides the primary power source for the vehicle. However, it will be appreciated that the described onboard humidifier system 106 is equally readily adaptable to any vehicle 100 type, including vehicles powered by combustion engines, hybrid electric-combustion engine vehicles, and others.

Figure 2:
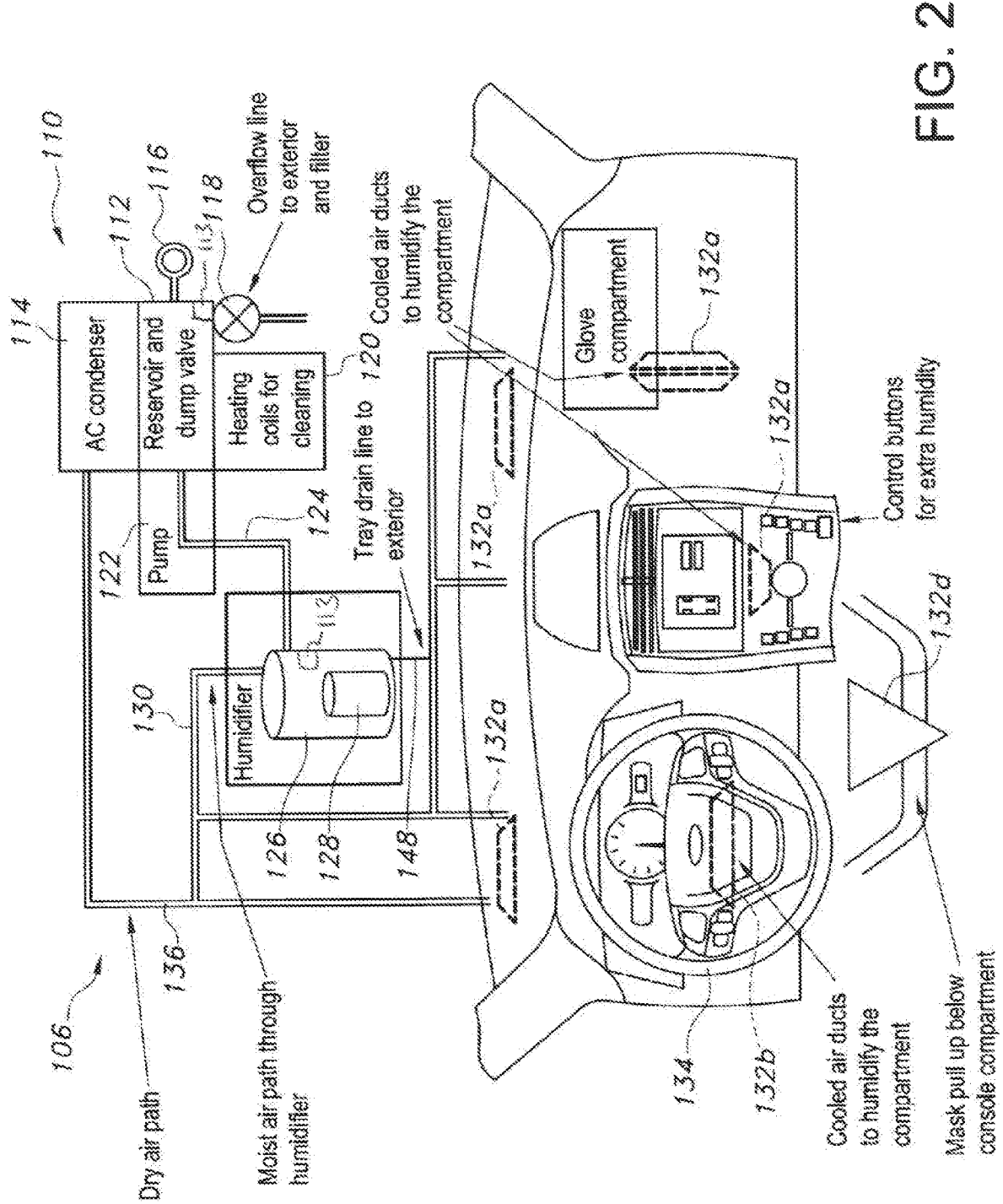
FIG. 2 depicts the onboard humidifier system of FIG. 1 in greater detail.

In more detail, with reference to FIG. 2 the onboard humidifier system 106 is associated generally with the vehicle HVAC system (shown generally as reference numeral 110). The components of a vehicle HVAC system 110 are well known in the art, and are not described in detail herein. Specifically, in the depicted embodiment the onboard humidifier system 106 includes a reservoir 112 adapted to collect water condensation/runoff from a vehicle heat exchanger 114, in the depicted embodiment being the air conditioner (AC) condenser. The reservoir includes a dump valve 116 in fluid communication with an overflow line 118 leading to a filtration system (not shown). Heating coils 120 may be included for heat-cleaning the collected water condensation. A similar water reclamation system is disclosed in greater detail in U.S. Published Patent Appl. No. 20160083936 to the present Assignee, Ford Global Technologies, LLC, the entirety of the disclosure of which is incorporated herein by reference as if fully reproduced. A pump 122 moves reclaimed water condensation via a line 124 placing the reservoir 112 in fluid communication with a humidifier 126. In the depicted embodiment the humidifier 126 includes a humidifying wick device 128, although alternative humidifier designs are contemplated.

Line 130 transports a humidified airflow from the humidifier 126 to one or more inlets 132. In the depicted embodiment, the inlets may be one or more of a dash panel 131-mounted air register 132a, a steering wheel 134-mounted air duct 132b, a roof panel or headliner-mounted air duct 132c, for example an air duct 132c associated with an overhead console (see FIG. 1), and a hose and mask apparatus 132d adapted to be worn by a user (not shown) to provide humidified air directly to the user. A return line 136 returns dry air to the HVAC system 110, in the depicted embodiment returning air to the AC condenser 114.

Returning to FIG. 1, the onboard humidifier system 106 may further include one or more sensors. In the depicted embodiment, the sensors include one or more onboard passenger cabin humidity sensors 138 (use of alternative sensors such as hygrometers and others is contemplated), one or more passenger cabin temperature sensors 140, and one or more exterior ambient temperature sensors 142. The onboard humidifier system 106 may further comprise one or more vehicle window interior temperature sensors 144. As will be appreciated, the window interior sensors 144 may be directly associated with an interior surface of each window 104a, 104b, 104c, . . . , 104x, or may comprise one or more remotely positioned infrared sensors.

The sensors are configured to provide inputs to one or more controllers 146 by wired or wireless means represented by dashed lines. As will be appreciated, any number of suitable microprocessor-based controllers 146 are contemplated, including without intending any limitation a centralized controller such as the vehicle Body Control Module (BCM), an HVAC controller, one or more other dedicated Electronic Control Units (ECU), or combinations.

In turn, the onboard humidifier system 106 includes a window 104 defrost/defog system 150. As will be appreciated, the defrost/defog system 150 which may comprise one or more air ducts 150a adapted to direct a heated airflow against an interior of a window 104 to prevent or remove frost/fog, may be an infrared window heater 150b directly associated with a window 104, or may be another type of window heating system such as heating coils or wires (not shown) embedded within one or more windows.

Figure 3:
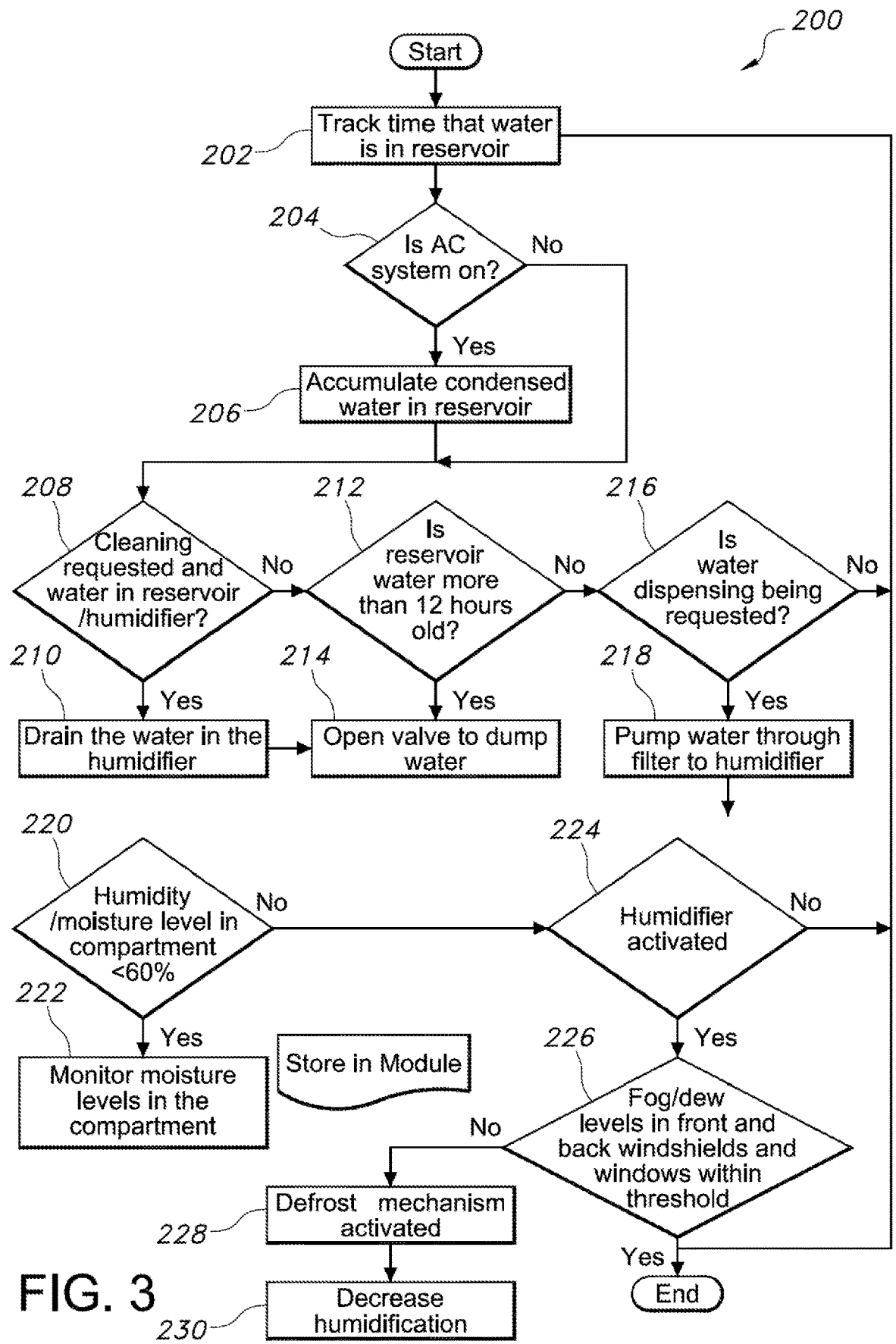
FIG. 3 illustrates in flow chart form a representative control method for the onboard humidifier system of FIG. 1.

Use of the onboard humidifier system 106 will now be described with reference to FIG. 3 illustrating a humidifier system control method 200. As will be appreciated, storing fluids such as water condensate for extended periods of time in a hot and potentially humid environment such as a vehicle 100 engine compartment presents a risk of contamination, for example by particulates and debris, mold, fungi, etc. Accordingly, as is described in greater detail in U.S. Published Patent Appl. No. 20160083936, provision is made for monitoring an amount of time water is stored in the reservoir 112 and for cleaning/renewing the stored water supply. At step 202, controller 146 is configured to monitor a time of storage of water condensate in reservoir 112. In one possible embodiment, a timer (not shown) associated with either the reservoir 112 or the controller 146 is started when the reservoir is filled. As will be described, the controller 146 is further configured to cause the contents of the reservoir 112 to be discarded if not passed to the humidifier 126 within a predetermined time period. In one possible embodiment, the predetermined time period may be 12 hours, although of course any suitable time period is contemplated.

At step 204, the controller 146 queries the system to determine if the AC condenser 114 is operating. If so, at step 206 the controller 146 actuates pump 122 to transfer water condensate from the AC condenser 114 to the reservoir 112 via line 124. If not, the system proceeds to the next step.

Next, a flush/clean step is provided. At step 208 the controller 146 determines whether water is present in the reservoir 112 and/or the humidifier 126. This may be via input provided from a water level sensor 113 such as an electronic sensor, a simple mechanical float, or other suitable device for determining a water level in the reservoir 112 and/or the humidifier 126. If so, at step 210 water is drained from the humidifier 126 via a drain line 148 (see FIG. 2) which passes the water to the vehicle 100 exterior.

If not, at step 212 the controller 146 determines whether the water contained in the reservoir 112 has been stored for more than the predetermined time period. If so, at step 214 the reservoir is drained by way of dump valve 116 (see FIG. 2). If not, at step 216 the controller 146 determines whether conditions requiring passage of water stored in reservoir 112 to the humidifier 126 have been detected. If not, the system returns to step 202. If so, at step 218 water is transferred to the humidifier 126 via pump 122/line 124. The water may be passed through a filter (not shown) prior to entry to the humidifier 126 to remove particulates, debris, etc.

At step 220, the controller 146 receives inputs from the one or more onboard passenger cabin humidity sensors 138 to determine a relative humidity level of the passenger cabin 102. If the determined relative humidity level if the passenger cabin 102 is above a predetermined threshold determined to provide satisfactory comfort to a passenger, the relative humidity level monitoring continues (step 222). If the passenger cabin relative humidity level is determined to have fallen below the predetermined threshold, at step 224 the humidifier 126 is actuated by the controller 146, and a humidified airflow is passed into the passenger cabin 102 by way of lines 130/inlets 132 (see FIG. 2).

Simultaneously or sequentially, at step 226 the controller 146 receives inputs from the one or more passenger cabin temperature sensors 140, one or more exterior ambient temperature sensors 142, and one or more vehicle window interior temperature sensors 144. From these inputs, the controller 146 calculates a window 104 fog/dew point and/or fog/dew level. If the calculated window 104 fog/dew point and/or fog/dew level is determined to be within a predetermined threshold whereby visibility is not considered impaired or at risk of impairment, the system returns to step 202. On the other hand, if the calculated window 104 fog/dew point and/or fog/dew level is not within the predetermined threshold, the controller 146 actuates the window defrost/defog system 150 to prevent or remove frosting/fogging from one or more windows 104.

In an embodiment, a rate of heat provided by the defrost/defog system 150 is determined by the controller 146 in accordance with the amount of humidity provided as humidified air from the humidifier 126 and according to a defogging algorithm.

Obvious modifications and variations are possible in light of the above teachings. All such modifications and variations are within the scope of the appended claims when interpreted in accordance with the breadth to which they are fairly, legally and equitably entitled.

What is claimed:

1. A humidifier system for a vehicle passenger cabin, comprising:
   an onboard humidifier in fluid communication with an onboard reservoir disposed to collect a fluid from a vehicle heat exchanger; and
   a controller configured to determine at least a passenger cabin relative humidity value and a dew point value for at least one vehicle window from sensor inputs;
   wherein the controller is further configured to:
      actuate the onboard humidifier to provide a humidified airflow sufficient to adjust a passenger cabin relative humidity from the determined passenger cabin relative humidity value to a predetermined passenger cabin relative humidity threshold value; and
      actuate a window heating system to heat the at least one vehicle window sufficiently to prevent or remove fogging resulting from the humidified airflow when the determined dew point value falls above a predetermined threshold dew point value.

2. The humidifier system of claim 1, wherein the controller is further configured to actuate the onboard humidifier to provide the humidified airflow into the passenger cabin for a sufficient time to adjust the determined passenger cabin relative humidity value to at least the predetermined passenger cabin relative humidity threshold value.

3. The humidifier system of claim 1, wherein the controller is further configured to control an amount of heat applied to the at least one vehicle window by the window heating system according to the adjusted passenger cabin relative humidity and the determined dew point for the at least one vehicle window.

4. The humidifier system of claim 1, wherein the controller is further configured to determine an amount of fluid collected in the onboard reservoir by way of one or more sensors.

5. The humidifier system of claim 1, wherein the humidified airflow is directed into the passenger cabin through an inlet selected from one or more of a dash panel-mounted air register, a headliner-mounted air vent, a steering wheel-mounted air vent, and a hose and mask apparatus adapted to be worn by a vehicle passenger.

6. The humidifier system of claim 1, wherein the humidifier system is adapted for manual actuation and/or for automatic actuation by the controller in accordance with the determined passenger cabin relative humidity value.

7. A vehicle including the humidifier system of claim 1.

8. A method for providing humidified air to a passenger cabin of a vehicle, comprising:
   providing an onboard humidifier system comprising at least a reservoir to collect a fluid from a vehicle heat exchanger and a humidifier in fluid communication with the reservoir, a window heating system, and a controller in operative communication with the humidifier and the window heating system, the controller being configured to determine at least a passenger cabin relative humidity and a dew point for at least one vehicle window;

by the controller, determining passenger cabin relative humidity and a dew point for at least one vehicle window from sensor inputs; and if the passenger cabin relative humidity is less than a predetermined threshold humidity level and the determined dew point falls above a predetermined dew point threshold value, by the controller, actuating the humidifier to provide a humidified airflow into the passenger cabin to provide an adjusted passenger cabin relative humidity level and actuating the window heating system to heat the at least one vehicle window sufficiently to prevent or reduce frost and/or fog.

9. The method of claim 8, including actuating the humidifier until the humidity level of the passenger cabin is raised to the predetermined threshold humidity level.

10. The method of claim 8, including, by the controller, determining an amount of fluid collected by the reservoir from sensor inputs.

11. The method of claim 10, including configuring the controller to receive inputs from one or more passenger cabin humidity sensors.

12. The method of claim 11, including configuring the controller to receive inputs from one or more window interior temperature sensors.

13. The method of claim 12, including configuring the controller to determine the dew point for the at least one vehicle window from the inputs from the one or more passenger cabin humidity sensors and the one or more window interior temperature sensors.

14. The method of claim 8, including setting the predetermined threshold humidity level at a relative humidity of 60%.

15. The method of claim 8, including, by the controller, adjusting an amount of heat supplied by the window heating system according to the adjusted passenger cabin humidity level and the determined dew point for the at least one vehicle window.

16. The method of claim 13, including, by the controller, automatically actuating the humidifier system when:

the amount of fluid collected in the reservoir is determined by the controller from one or more sensor inputs to be at or above a predetermined minimum volume; and the inputs provided to the controller by the one or more passenger cabin humidity sensors indicate that the passenger cabin humidity level is below the predetermined threshold humidity level.

* * * * *